United States Patent [19]

Tanaka

[11] Patent Number: 5,502,823
[45] Date of Patent: Mar. 26, 1996

[54] BUS SYSTEM WITH VIRTUAL LOGICAL BUFFER

[75] Inventor: Shigeo Tanaka, Tokyo, Japan

[73] Assignee: Sony Corporation, Tokyo, Japan

[21] Appl. No.: 18,207

[22] Filed: Feb. 16, 1993

[30] Foreign Application Priority Data

Feb. 13, 1992 [JP] Japan ..................... 4-059499

[51] Int. Cl.⁶ .................................................. G06F 13/10
[52] U.S. Cl. ........................... 395/310; 395/872; 395/850
[58] Field of Search ..................... 395/325, 725, 395/275, 200, 250, 310, 850, 849, 872, 733

[56] References Cited

U.S. PATENT DOCUMENTS

| | | | |
|---|---|---|---|
| 4,071,887 | 1/1978 | Daly et al. ......................... | 395/200 |
| 4,794,386 | 12/1988 | Bedrij et al. ......................... | 395/157 |
| 5,123,107 | 6/1992 | Mensch, Jr. ........................ | 395/800 |
| 5,208,913 | 5/1993 | Yamamoto ......................... | 395/250 |
| 5,253,060 | 10/1993 | Welmer et al. ..................... | 358/140 |
| 5,276,807 | 1/1994 | Kodama et al. .................... | 395/200 |
| 5,353,415 | 10/1994 | Wolford et al. .................... | 395/325 |

*Primary Examiner*—Glenn A. Auve
*Attorney, Agent, or Firm*—Jay H. Maioli

[57] ABSTRACT

A bus system is disclosed in which the CPU reads program controlling data from a ROM and stores the read data into a RAM through an internal bus line. The CPU causes interrupts on the RAM at predetermined timing to thereby supply data required for controlling to such electronic units as a VTR and an LDP. With the described arrangement, no matter of what specification the communication IC used may be, the change required to be made in the related program can be reduced.

3 Claims, 3 Drawing Sheets

BUS SYSTEM WITH VIRTUAL LOGICAL BUFFER

BACKGROUND OF THE INVENTION

1. Field of the Invention

The present invention relates to a bus line system suitable for use for example in an AV system.

2. Description of the Related Art

In AV systems, electronic units such as a VTR and an LDP (laser disk player) are arranged to be centrally controlled by an AV center. With such arrangement, a plurality of units can be externally combined for use. For example, an LDP 4 and a VTR 3 can be brought into a cascade connection through a D2B bus line 21, as shown in FIG. 3, so that a video disk is reproduced by the LDP 4 and the reproduced signal is supplied to the VTR 3 and, thereby, a video signal reproduced from a video disk is recorded on a video tape. Such recording operations can be performed under instructions from the AV center 1.

In the AV center 1, a ROM 13, which is formed of a plurality of modules with predetermined programs written therein, is connected with a CPU 12 and a RAM 14 through an internal bus line 22, and between the internal bus line 22 and the D2B bus line 21, there is provided a communication IC 18 so that controlling operations between the AV center 1 and external units are performed therethrough.

Within the ROM 13, there are provided a TV main routine for controlling a TV system, a TV-D2B interface module for controlling an interface between the TV and the D2B bus line, a D2B module for switching inputs and outputs of TV monitor/tuner/AV controller, a D2B protocol module for D2B protocol control, and a D2B communication IC control module for controlling the D2B communication IC, each of which is a module with a predetermined program written therein.

Of such prior art systems, some have a frame buffer 18a within the communication IC 18 and others have no such frame buffer in the communication IC 18. In order to have a system adapted to such different types of communication ICs, the program in the D2B communication IC control module must be changed according to each type of the communication ICs. More specifically, when the communication IC without a frame buffer is used, the data transfer must be processed in units of bits and, hence, the D2B communication IC control module must be changed accordingly.

SUMMARY OF THE INVENTION

The present invention has been made in view of the above described problem. Accordingly, it is an object of the present invention to provide a bus system in which, no matter what specification the communication IC may have, only a small portion of the corresponding control relative program is required to be changed.

In order to solve the above problem, there is provided a bus system, in which electronic units connected with a bus line are controlled according to data transmitted over the bus line from a control portion performing program control, characterized in that it comprises a first control portion for transmitting program controlling data through the bus line, a virtual logical buffer acquiring data transmitted from the control portion, and a second control portion causing interrupts on the virtual logical buffer at predetermined timing to thereby transmit data for control to the electronic units.

The present invention is further characterized, in the bus system as described above, in that the bus line is put in a cascade connection with electronic units.

The CPU 12 (first control portion) reads program controlling data from the ROM 13 and stores the read data into the RAM 14 (virtual logical buffer) through the internal bus line 22 and the CPU 12 (second control portion) causes interrupts on the RAM 14 at predetermined timing to thereby supply data required for control to electronic units such as a VTR 3 and an LDP 4.

DESCRIPTION OF THE PREFERRED EMBODIMENT

In the structure of programs of the present invention, a D2B communication IC 18 is not directly controlled with a D2B communication IC control module, as the main module for controlling communication, in a ROM 13, but a virtual logical buffer, i.e., a frame buffer, is set up in an area of a RAM 14 under the control of the CPU and the program control is performed thereby through reading and writing data on the portion of the RAM 14 set up as the virtual logical buffer. By the use of timer interruption for transferring data from the virtual logical buffer to the D2B communication IC 18, the CPU processes the transfer in a shorter period than the period for transferring one frame, and, thereby, an overflow is prevented from occurring in a buffer within the D2B communication IC 18.

Figure 1:
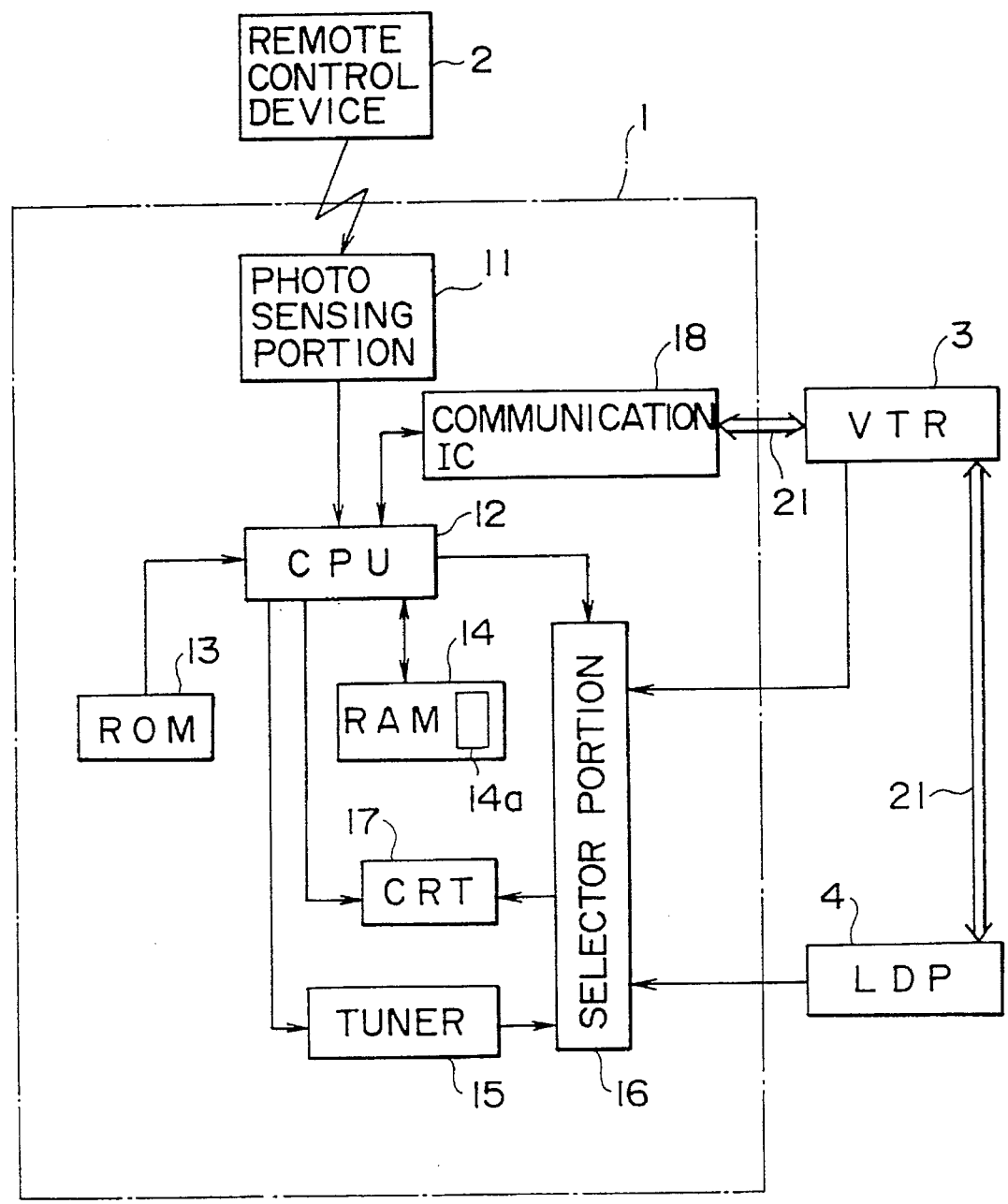
FIG. 1 is a block diagram showing a structure of an embodiment of the present invention.

FIG. 1 is a block diagram showing an embodiment of the present invention, in which an AV center 1 is adapted to be remote controlled by having a light sensing portion 11 therein receiving an optical signal of infrared radiation or the like transmitted from a remote control device 2. The received optical signal is supplied to the CPU 12 and decoded thereby, predetermined data are read from the relative modules stored in the ROM 13 to be temporarily stored in the RAM 14, and controlling operations are performed as instructed by the remote control device 2.

The controlling operations are such as to operate a tuner 15, to switch a selector portion 16 so that a predetermined monitoring operation is performed with a CRT 17, and to transmit controlling signals over a D2B bus line 21 through the communication IC 18 so that operation of a VTR 3 or an LDP 4 is controlled. When the CPU 12 controls the communication IC 18, it uses a portion of the RAM 14 as a virtual logical buffer 14a to temporarily store data in units of frames therein and reads the data by causing interrupts at predetermined time periods to output the read data through the communication IC 18.

Data transfer from the virtual logical buffer 14a to the communication IC 18 or the data transfer in the opposite direction is performed at the speed of the CPU 12 making timer interruption within a sufficiently shorter period than that taken by the transfer of data from the ROM 13 to the RAM 14.

Figure 2:
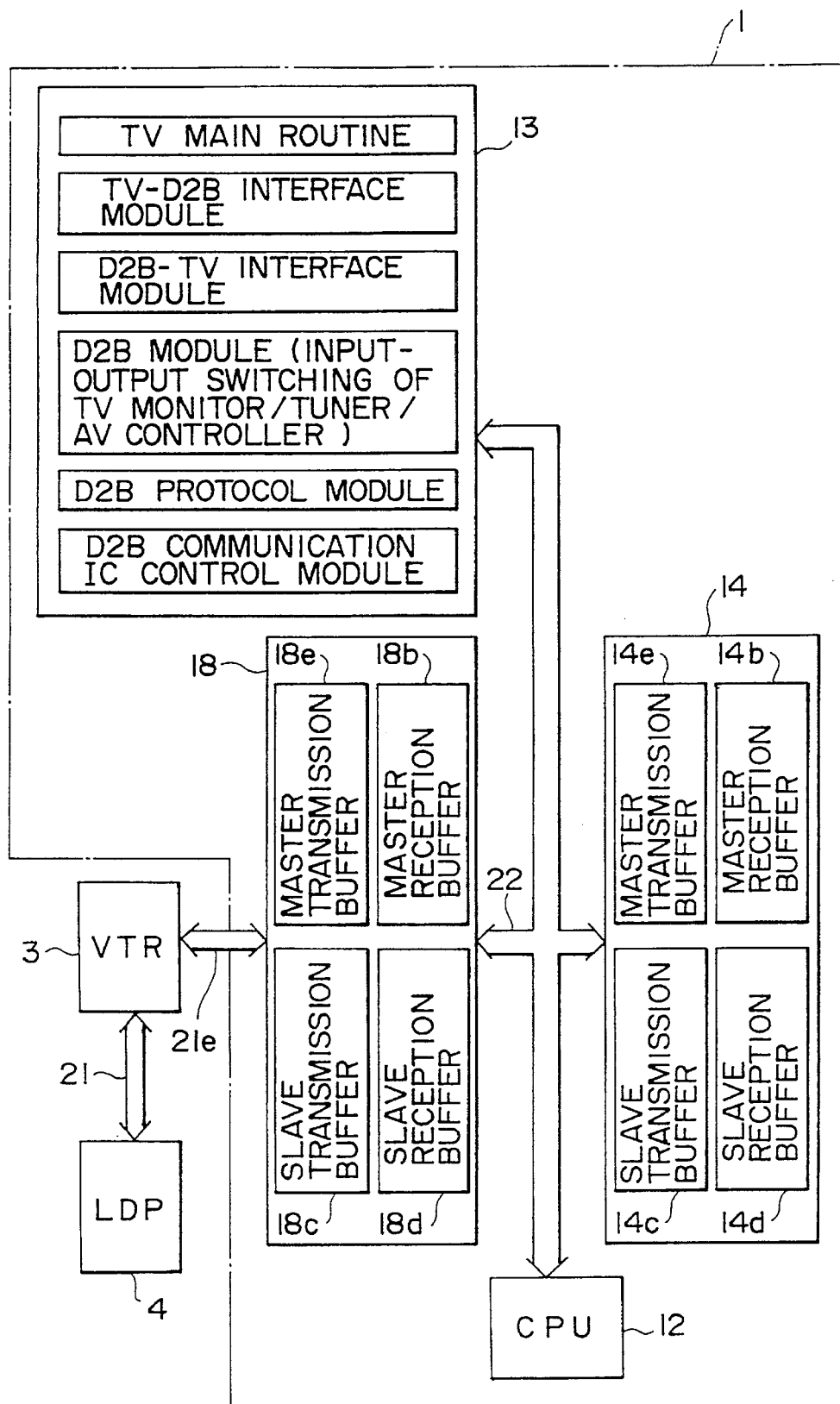
FIG. 2 is a block diagram showing a structure of the main portion of FIG. 1.
Figure 3:
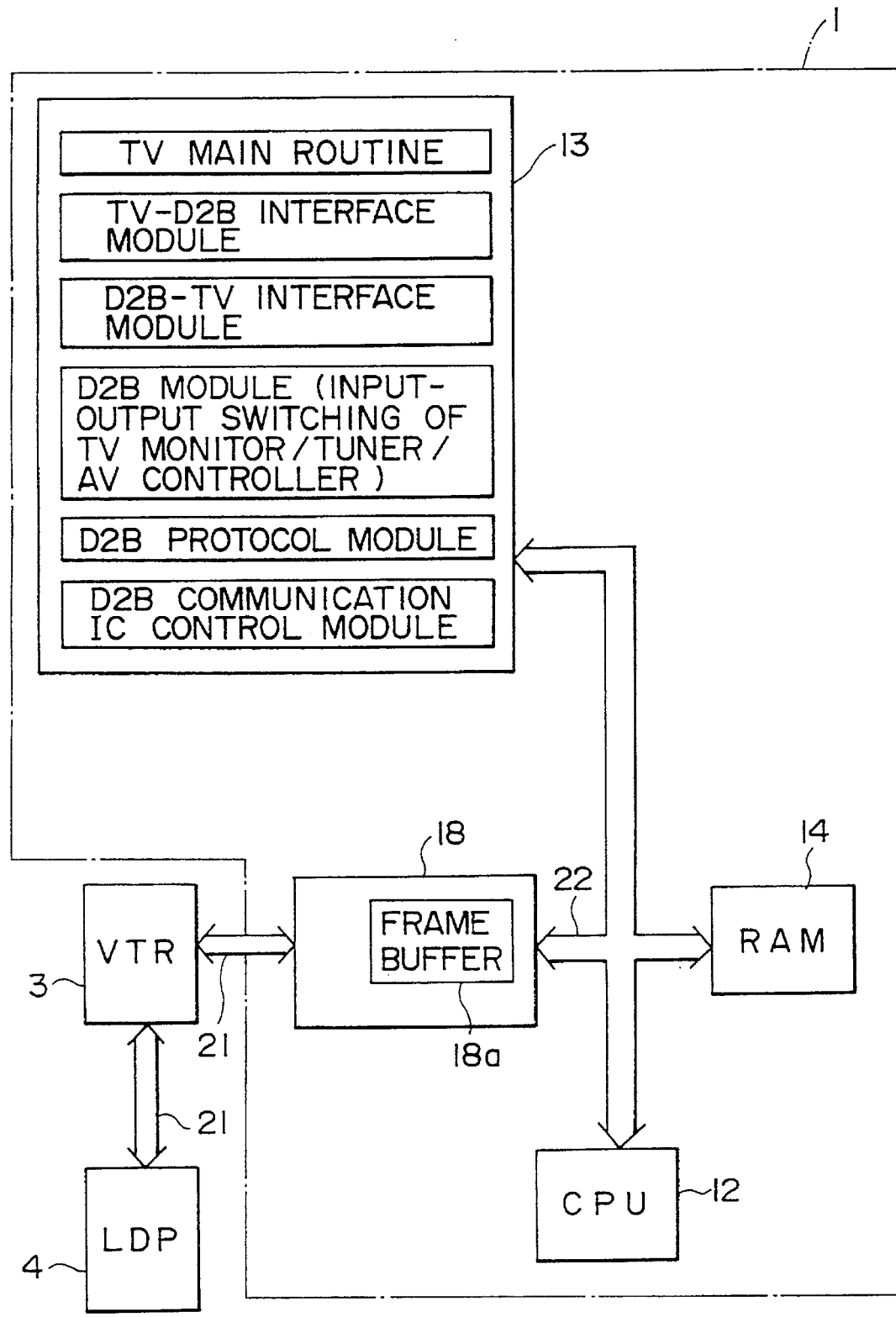
FIG. 3 is a block diagram showing a structure of a prior art example.

FIG. 2 is a block diagram showing the main portion of FIG. 1, in which the virtual logical buffer 14a of the RAM 14 is formed of a master transmission buffer 14e, a master reception buffer 14b, a slave transmission buffer 14c, and a slave reception buffer 14d. When the communication IC 18 includes a frame buffer, it is similarly formed of a a master transmission buffer 18e, a master reception buffer 18b, a slave transmission buffer 18c, and a slave reception buffer 18d.

Of these buffers, master buffers are used when the AV center 1 is on the master side and slave buffers are used when the AV center 1 is on the slave side. Since data of a one-frame unit is stored in the virtual logical buffer 14a, the communication IC 18 may or may not have its own frame buffer. When the communication IC 18 has a frame buffer, data may be transferred from the virtual logical buffer 14a to the communication IC 18 in units of frames or bits, and when the communication IC 18 has no frame buffer, data may be transferred from the virtual logical buffer 14a to the communication IC 18 in units of bits.

In such case, in whichever design the communication IC 18 may be, the D2B communication IC control module will not need to be changed, or will need, if it should be changed, to be changed slightly. For example, when data is to be transmitted in units of bits, the D2B communication IC control module needs no change made therein even if the communication IC 18 has its own frame buffer, or when data is to be transmitted in units of frames, only the relative portion may be required to be changed.

Since the present invention as described above is arranged such that a virtual logical buffer is set up in the RAM and data is transferred from the ROM to the virtual logical buffer, it is made possible to transfer data from the ROM to the virtual logical buffer in units of frames at all times. Therefore, such an advantageous effect can be obtained that the D2B communication IC control module can be generally used irrespective of the design of the communication IC.

What is claimed is:

1. A bus system, including electronic units connected with a bus line and controlled according to program controlling data transmitted over the bus line, the bus system comprising:

program storage means for storing a plurality of program data including the program controlling data;

a communication circuit connected to the bus line, for transmitting the program controlling data to the electronic units via the bus line; and memory means including a virtual logical buffer for temporarily storing the program controlling data in units of frames, and supplying the program controlling data to the communication circuit to be transmitted to the electronic units;

controlling means including a first control unit for controlling a transfer of the program controlling data from the program storage means to the memory means, and a second control unit for supplying interrupt signals to the virtual logical buffer at predetermined time intervals and thereby controlling a transfer of the program controlling data in units of bits from the virtual logical buffer to the communication circuit.

2. A bus system according to claim 1, wherein the bus line is put in a cascade connection with the electronic units.

3. A bus system according to claim 1, wherein the communication circuit includes a second buffer for temporarily storing the program controlling data transferred from the virtual logical buffer to the communication circuit, the program controlling data being transferred in units of bits or frames.

* * * * *